US011528356B2

(12) United States Patent
Diaz et al.

(10) Patent No.: US 11,528,356 B2
(45) Date of Patent: Dec. 13, 2022

(54) METHOD AND SYSTEM FOR VERIFYING THE OPERABILITY OF A TARGET DEVICE

(71) Applicant: JPMorgan Chase Bank, N.A., New York, NY (US)

(72) Inventors: Alan Diaz, Brooklyn, NY (US); Marie Drapalova, Harrison, NJ (US); Jigarkumar P. Patel, Monroe Township, NJ (US); Jigar Ajay Kothari, West New York, NJ (US); Adeel A. Khan, Monmouth Junction, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 68 days.

(21) Appl. No.: 17/110,689

(22) Filed: Dec. 3, 2020

(65) Prior Publication Data

US 2021/0174110 A1    Jun. 10, 2021

Related U.S. Application Data

(60) Provisional application No. 62/943,989, filed on Dec. 5, 2019.

(51) Int. Cl.
| | | |
|---|---|---|
| *H04M 3/24* | (2006.01) | |
| *H04L 65/1096* | (2022.01) | |
| *H04L 9/32* | (2006.01) | |
| *G06F 3/0488* | (2022.01) | |
| *G06V 30/10* | (2022.01) | |

(52) U.S. Cl.
CPC ............... *H04M 3/24* (2013.01); *H04L 9/32* (2013.01); *H04L 65/1096* (2013.01); *G06F 3/0488* (2013.01); *G06V 30/10* (2022.01)

(58) Field of Classification Search
None
See application file for complete search history.

(56) References Cited

U.S. PATENT DOCUMENTS

| 9,852,049 | B2 * | 12/2017 | Hey | G06F 11/3668 |
|---|---|---|---|---|
| 11,099,972 | B2 * | 8/2021 | Puszkiewicz | G06F 11/3664 |
| 2015/0208258 | A1 * | 7/2015 | Brenzel | H04W 76/10 455/418 |
| 2016/0034383 | A1 * | 2/2016 | Duan | G06F 11/3664 717/131 |
| 2019/0026215 | A1 * | 1/2019 | Agarwal | G06F 11/3672 |
| 2019/0324890 | A1 * | 10/2019 | Li | G06F 11/3664 |
| 2020/0050534 | A1 * | 2/2020 | Sze | G06F 11/277 |

* cited by examiner

*Primary Examiner* — Quoc D Tran
(74) *Attorney, Agent, or Firm* — Greenblum & Bernstein, P.L.C.

(57) ABSTRACT

A method and computing apparatus for verifying an operability of a target device are provided. The method includes sequentially obtaining first image information of the target device, initiating a communication with the target device, obtaining second image information of the target device, comparing the first image information with the second image information; and determining whether the target device is operational based on a result of the comparing wherein the target device is determined as being operational when the first image information is different from the second image information, and the target device is determined as at least one of not receiving communications and not operational when the first image information is identical to the second image information.

18 Claims, 8 Drawing Sheets

METHOD AND SYSTEM FOR VERIFYING THE OPERABILITY OF A TARGET DEVICE

CROSS-REFERENCE TO RELATED APPLICATIONS

This application claims the benefit of U.S. Provisional Patent Application Ser. No. 62/943,989, filed Dec. 5, 2019, which is hereby incorporated by reference in its entirety.

BACKGROUND

1. Field of the Disclosure

This technology generally relates to methods and systems for verifying the operability of a target device, and more particularly to methods and systems for verifying the operability of a target device by comparing information related to images obtained before and after initiating communication with the target device.

2. Background Information

A modern day organization may manage a number of devices, including but not limited to, telephones. Such managed devices of the organization may be geographically distributed in various locations across the world.

Organizations often at least one of add additional devices and upgrade existing devices. When the organization adds to and/or upgrades managed devices, it may be expensive, difficult, or impossible to verify the operability of each and every added or upgraded device.

An organization conventionally may verify the operability of such added or upgraded devices by, e.g., tasking members of the organization or outside personnel to physically visit the locations of the added or upgraded devices and manually test the added or upgraded devices to verify the tested devices are functioning or operating correctly. If the added or upgraded devices are, e.g., of a great number, often only a fraction of the added or upgraded devices may be tested as samples. Thus, the organization may not verify the operability of each and every added or upgraded device.

For telephone devices, conventional functional validation may be performed by a human in proximity of a target telephone dialing the phone number of the target telephone and determining the target telephone is functional or operational based on an observation of whether or not the telephone received the call. This conventional functional validation technique is time consuming and requires a human to travel to the physical location and be in the physical presence of the target telephone.

In many instances, (1) the number of devices to verify may be very large, e.g., on the order of hundreds, thousands, or more; (2) the amount of time allotted to upgrade (or add) devices and verify the upgraded (or added) devices is very short, e.g., on the order of a couple days, a few hours, or less; (3) there may be devices located in a large number of places; and (4) the places in which the devices are located may be physically distant from one another, e.g., in various places around the world.

As a result, an organization may typically only verify a relatively low number of the added/upgraded devices, because verifying each and every device is impractical and overly time-consuming, especially when there are a large number of devices; when a relatively short period of time is allotted to upgrade, add, and verify devices, when the devices are scattered in many locations; and/or when the devices are physically distant from one another.

Accordingly, there is a need to accurately, quickly, and conveniently verify an operability of a target device with little to no human interaction.

SUMMARY

The present disclosure, through one or more of its various aspects, embodiments, and/or specific features or sub-components, provides, inter alia, various systems, servers, devices, methods, media, programs, and platforms for verifying an operability of a target device.

According to an aspect of the present disclosure, a method for verifying an operability of a target device is provided. The method is implemented by at least one processor. The method includes obtaining, by a processor, first image information of the target device; initiating, by the processor, a communication with the target device after the first image information is obtained; obtaining, by the processor, second image information of the target device after the communication with the target device is initiated; comparing, by the processor, the first image information with the second image information; and determining, by the processor, whether the target device is operational based on a result of the comparing.

The target device may be determined as being operational when the first image information is different from the second image information.

The target device may be determined as at least one of not receiving communications and not operational when the first image information is identical to the second image information.

In an exemplary embodiment, the first image information may include information calculated by applying a one-way hash function to a portion of a first image of a display of the target device, and the second image information may include information calculated by applying the one-way hash function to a portion of a second image of the display of the target device.

In an exemplary embodiment, the comparing may include comparing the first image information which may include information calculated by applying the one-way hash function to the portion of the first image of the display of the target device with the second image information which may include information calculated by applying the one-way hash function to the portion of the second image of the display of the target device.

In another exemplary embodiment, the comparing may include comparing each respective pixel of the first image information with a corresponding pixel of the second image information.

The first image information may be information that relates to a first screenshot of a display of the target device, and the second image information may be information that relates to a second screenshot of the display of the target device.

The performing may include optical character recognition on at least one of the first image information and the second image information. And, the optical character recognition may include a recognition of at least one of "forwarded" and "logged out."

The target device may be a telephone. And, the initiating the communication may include dialing the telephone.

According to an aspect of the present disclosure, a computing apparatus for verifying an operability of a target device is provided. The computing apparatus comprises: a processor; a memory; and a communication interface coupled to each of the processor, the memory, and a display screen, wherein the processor is configured to: obtain first image information of the target device; initiate a communication with the target device after the first image information is obtained, obtain second image information of the target device after the communication with the target device is initiated; compare the first image information with the second image information; and determine whether the target device is operational based on a result of the comparison.

The processor of the computing device may be further configured to determine the target device is operational when the first image information is different from the second image information.

The processor of the computing device may be further configured to determine the target device is at least one of not receiving communications and not operational when the first image information is identical to the second image information.

In an exemplary embodiment, the first image information may include information calculated by applying a one-way hash function to a portion of a first image of a display of the target device and the second image information may include information calculated by applying the one-way hash function to a portion of a second image of the display of the target device.

In an exemplary embodiment, the processor of the computing device may be further configured to compare the first image information which may include information calculated by applying the one-way hash function to the portion of the first image of the display of the target device with the second image information which may include information calculated by applying the one-way hash function to the portion of the second image of the display of the target device.

In another exemplary embodiment, the processor of the computing device may be further configured to compare each respective pixel of the first image information with a corresponding pixel of the second image information.

The first image information may be information that relates to a first screenshot of a display of the target device, and the second image information may be information that relates to a second screenshot of the display of the target device.

The processor of the computing device may be further configured to perform optical character recognition on at least one of the first image information and the second image information.

The processor of the computing device may be further configured to perform the optical character recognition by recognizing at least one of "forwarded" and "logged out."

The target device may be a telephone. And, the processor of the computing device may be further configured to initiate the communication by dialing the telephone.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
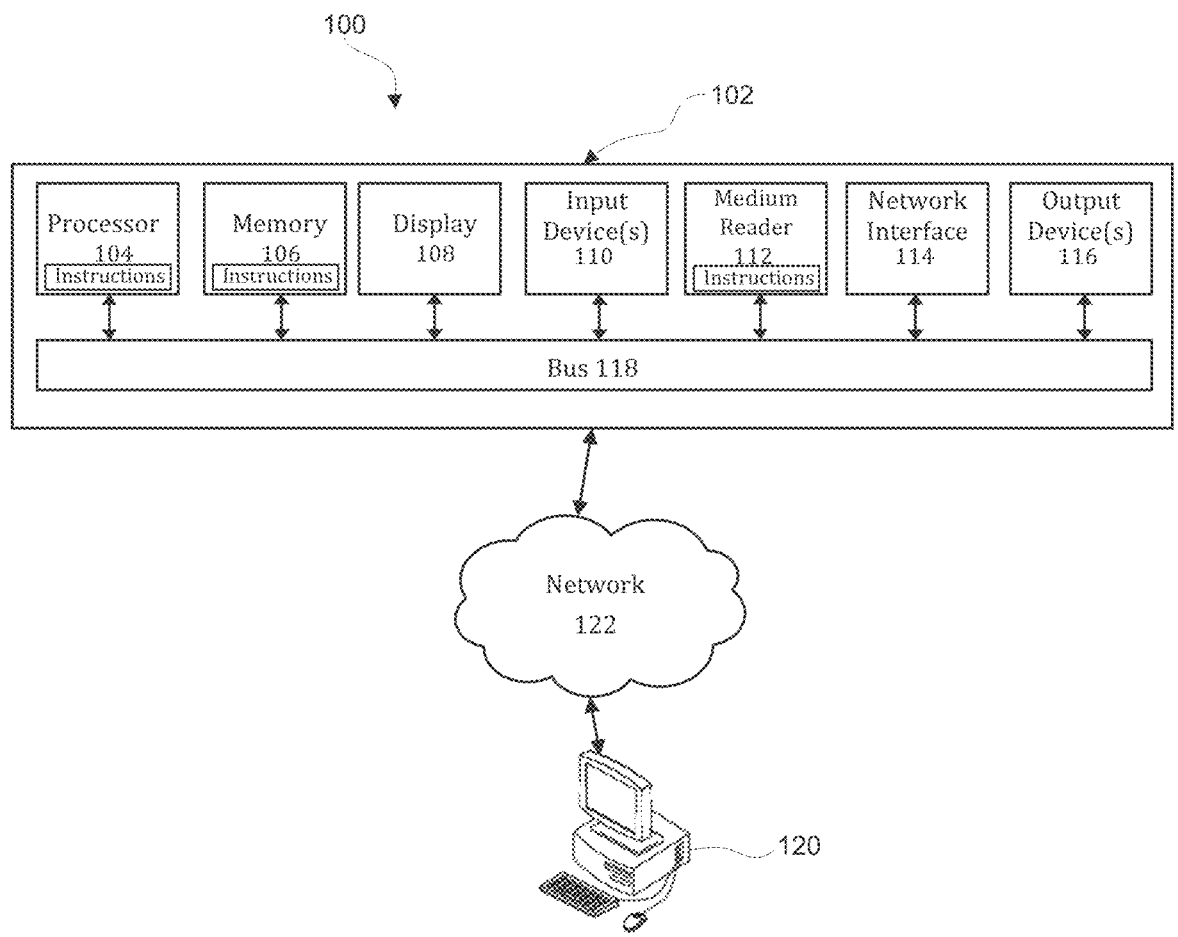
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for verifying an operability of a target device.

Figure 2:
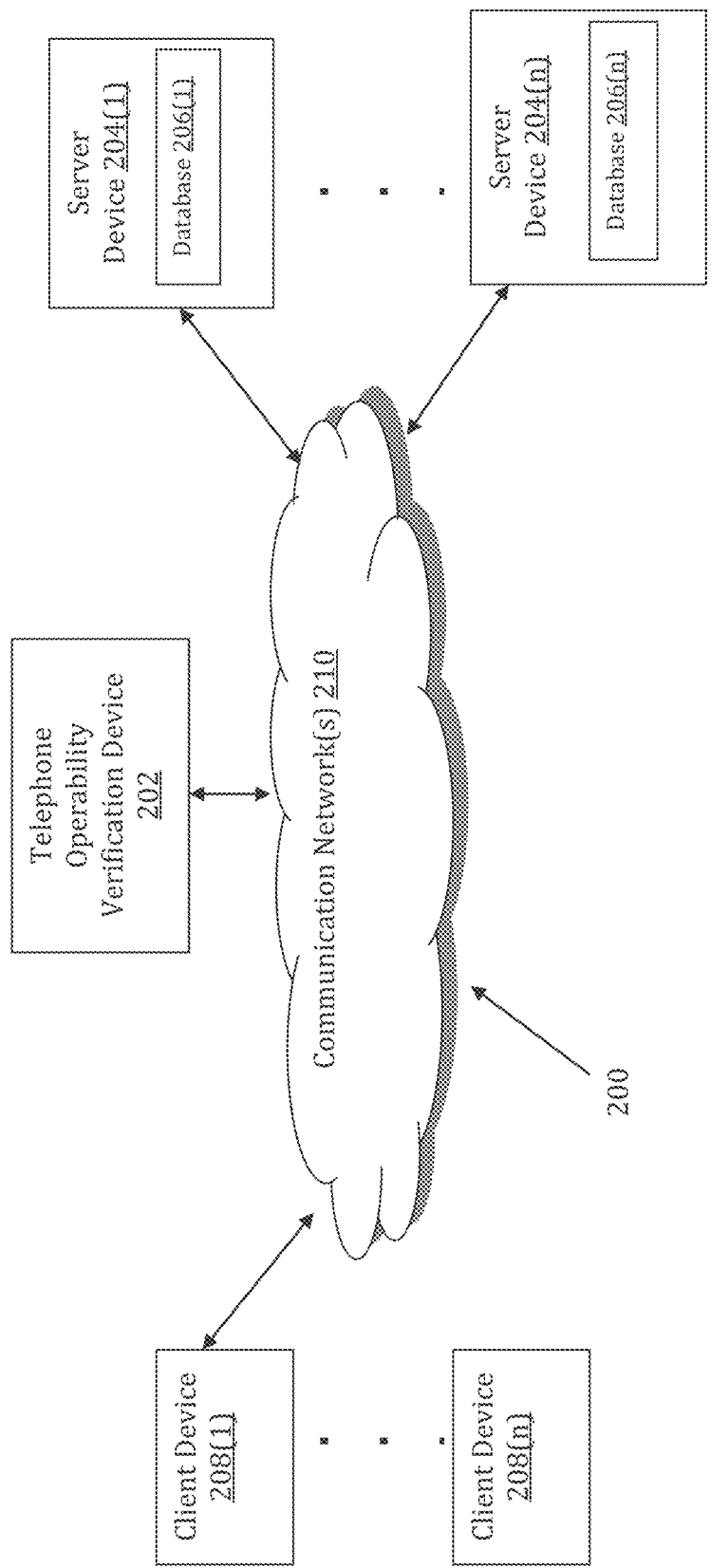
FIG. 2 illustrates an exemplary diagram of a network environment.

Referring to FIG. 2, a schematic of an exemplary network environment 200 for implementing a method for verifying an operability of a target device is illustrated. In an exemplary embodiment, the method is executable on any networked computer platform, such as, for example, a personal computer (PC).

The method for verifying an operability of a target device may be implemented by a Telephone Operability Verification (TOV) device 202. The TOV device 202 may be the same or similar to the computer system 102 as described with respect to FIG. 1. The TOV device 202 may store one or more applications that can include executable instructions that, when executed by the TOV device 202, cause the TOV device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TOV device 202 itself, may be located in virtual server(s) running in a cloud-based computing environment rather than being tied to one or more specific physical network computing devices. Also, the application(s) may be running in one or more virtual machines (VMs) executing on the TOV device 202. Additionally, in one or more embodiments of this technology, virtual machine(s) running on the TOV device 202 may be managed or supervised by a hypervisor.

In the network environment 200 of FIG. 2, the TOV device 202 is coupled to a plurality of server devices 204(1)-204(n) that hosts a plurality of databases 206(1)-206(n), and also to a plurality of client devices 208(1)-208(n) via communication network(s) 210. A communication interface of the TOV device 202, such as the network interface 114 of the computer system 102 of FIG. 1, operatively couples and communicates between the TOV device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TOV device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TOV devices that efficiently implement a method for verifying the operability of a target device.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TOV device 202 may be a standalone device or integrated with one or more other devices or apparatuses, such as one or more of the server devices 204(1)-204(n), for example. In one particular example, the TOV device 202 may include or be hosted by one of the server devices 204(1)-204(n), and other arrangements are also possible. Moreover, one or more of the devices of the TOV device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TOV device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206

(*n*) that are configured to store image information data, optical character recognition data, image information comparison algorithm data, target device information data, and data that relates to verifying the operability of a target device.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the TOV device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the TOV device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the TOV device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TOV device 202, the server devices 204(1)-204(*n*), or the client devices 208(1)-208(*n*), for example, may be configured to operate as virtual instances on the same physical machine. In other words, one or more of the TOV device 202, the server devices 204(1)-204(*n*), or the client devices 208(1)-208(*n*) may operate on the same physical device rather than as separate devices communicating through communication network(s) 210. Additionally, there may be more or fewer TOV devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
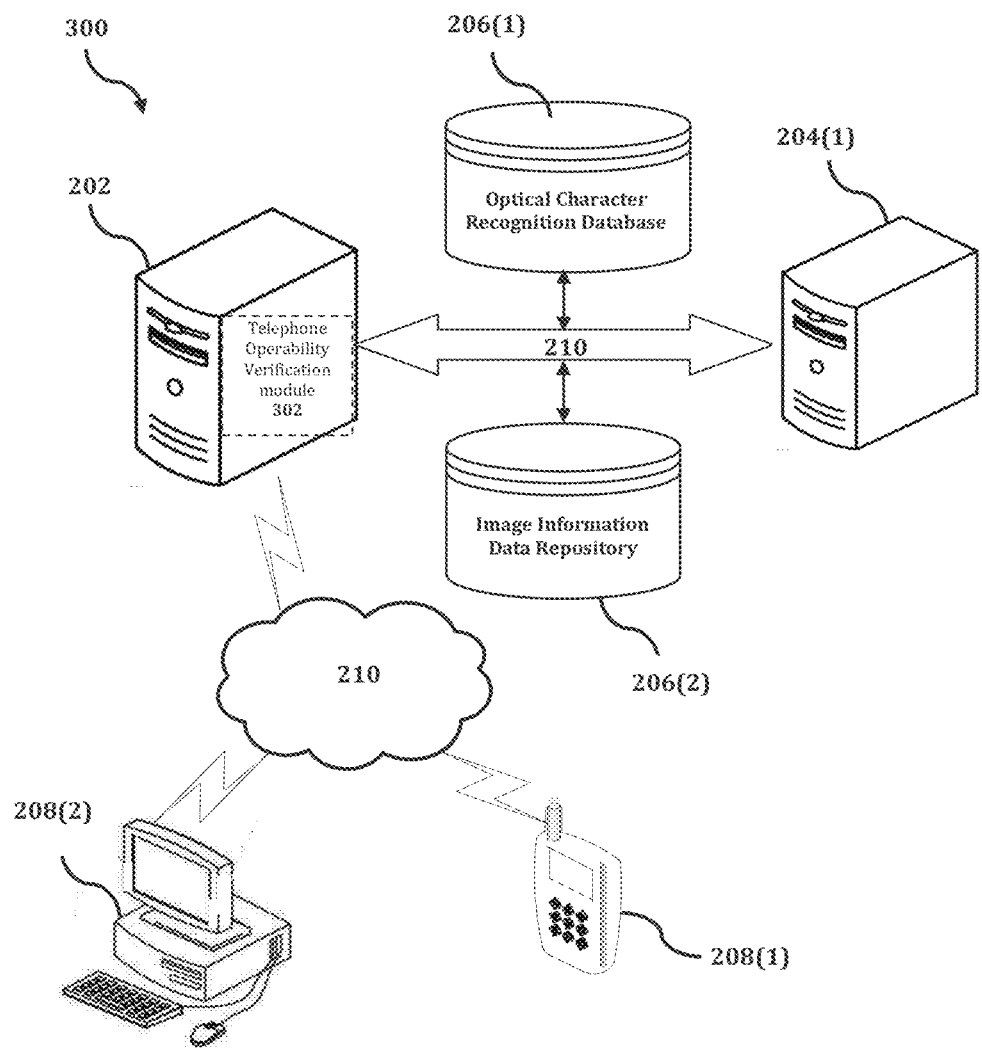
FIG. 3 shows an exemplary system for implementing a method for verifying the operability of a target device.

The TOV device 202 is described and shown in FIG. 3 as including Telephone Operability Verification module 302, although it may include other rules, policies, modules, databases, or applications, for example. As will be described below, the Telephone Operability Verification module 302 is configured to implement a method for verifying an operability of at least one target device, e.g., at least one target telephone.

An exemplary process 300 for implementing a mechanism for verifying an operability of a target device by utilizing the network environment of FIG. 2 is shown as being executed in FIG. 3. Specifically, a first client device 208(1) and a second client device 208(2) are illustrated as being in communication with TOV device 202. In this regard, the first client device 208(1) and the second client device 208(2) may be "clients" of the TOV device 202 and are described herein as such. Nevertheless, it is to be known and understood that the first client device 208(1) and/or the second client device 208(2) need not necessarily be "clients" of the TOV device 202, or any entity described in association therewith herein. Any additional or alternative relationship may exist between either or both of the first client device 208(1) and the second client device 208(2) and the TOV device 202, or no relationship may exist.

According to an exemplary embodiment, client devices 208(1)-208(*n*) may be embodied by or related to a plurality of telephones. In an exemplary embodiment, telephone of the plurality of telephones may be associated with at least one individual of an organization. In another exemplary embodiment, a telephone of the plurality of telephones is associated with at least one group of individuals. In yet another exemplary embodiment, a telephone of the plurality of telephones may be associated with a location such as, e.g., an organization's headquarters, an organization's corporate office, an organization's retail location, an organization's sales office, an organization's administrative office, an organization's field office, or a home office of an individual of an organization.

The plurality of telephones may include at least one of a landline telephone, an Internet Protocol (IP) telephone, an Internet phone, an online phone, a computer (e.g., a personal computer, laptop, or tablet), a cellular telephone, a smartphone, a mobile device, a wearable device, and an Internet of Things (IoT) device. At least one telephone of the plurality of telephones may use, for example, a circuit-switched network, a packet-switched network, Voice over Internet Protocol (VoIP), IP telephony, broadband telephony, broadband phone service, Voice over Long-Term Evolution (i.e., Voice over LTE or VoLTE), Wireless Fidelity (Wi-Fi) Calling, Public Switched Telephone Network (PSTN), or Plain Old Telephone Service (POTS). At least one telephone of the plurality of telephones may be configured to communicate at least one of audio data, voice communications, video data, and multimedia data.

In an exemplary embodiment, TOV device 202 is illustrated as being able to access an optical character recognition database 206(1) and an image information data repository 206(2). The Telephone Operability Verification module 302 may be configured to access these databases for implementing a method for verifying an operability of a target device.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the TOV device 202 via broadband or cellular communication. Of course, these embodiments are merely exemplary and are not limiting or exhaustive.

Upon being started, the Telephone Operability Verification module 302 executes a process for verifying an operability of a target device. An exemplary process for verifying an operability of a target device is generally indicated at flowchart 400 in FIG. 4.

Figure 4:
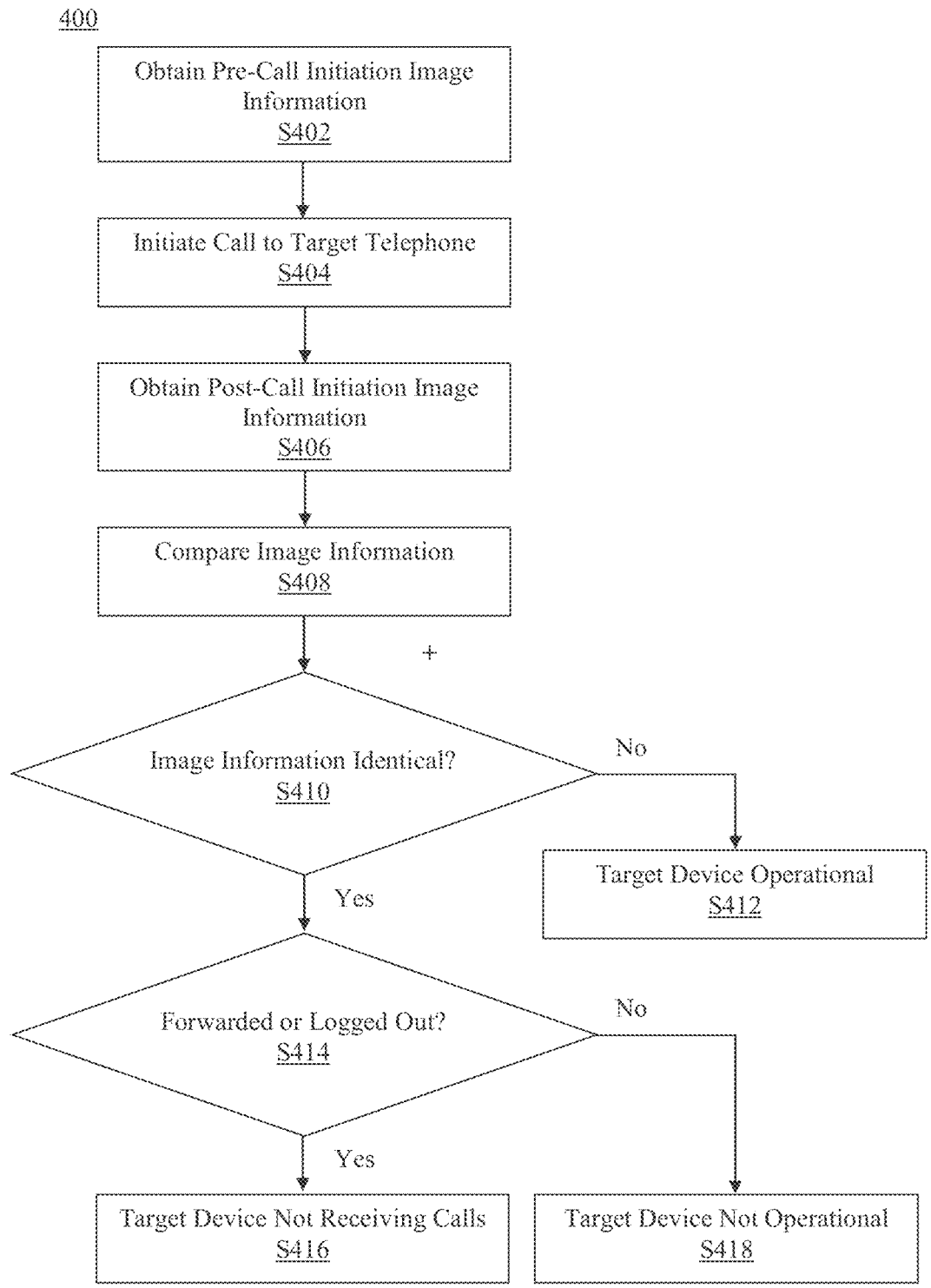
FIG. 4 is a flowchart of an exemplary process for implementing a method for verifying the operability of a target device.

In the process 400 of FIG. 4, at step 402, the Telephone Operability Verification module 302 obtains or receives first image information of a target device. In an exemplary embodiment, the first image information may be pre-call initiation image information of a target device. Pre-call initiation image information may include, e.g., image information obtained, calculated, or received prior to initiating a telephone call with the target telephone.

In an exemplary embodiment, the pre-call initiation image information is information relating to an image of a display of a target telephone at a time before the target telephone is called. For example, the pre-call initiation image information may relate to a screenshot image of the display of the target telephone at a time before the target telephone is called. Hereinafter "pre-call initiation screenshot image" refers a screenshot representing a display of a target telephone at a time before the target telephone is called.

In an exemplary embodiment the Telephone Operability Verification module 302 accesses a database and retrieves an IP address of a target telephone connected to the Internet. The Telephone Operability Verification module 302 may use the IP address of the target telephone to obtain the pre-call initiation screenshot image.

In an exemplary embodiment, the Telephone Operability Verification module 302 may capture a pre-call initiation screenshot image using a remote connection with the target telephone. In another exemplary embodiment, the target telephone may obtain a pre-call initiation screenshot image and transmit the pre-call initiation screenshot image to the Telephone Operability Verification module 302 over the Internet. In yet another exemplary embodiment, the target telephone may capture a pre-call initiation screenshot image, obtain pre-call initiation image information from the pre-call initiation screenshot image, and transmit the pre-call initiation image information to the Telephone Operability Verification module 302.

In an exemplary embodiment, the data format of the pre-call initiation image information may be the same as or similar to the data format of the pre-call initiation screenshot image. For example, the data format of the pre-call initiation image information and the data format of the pre-call initiation screenshot image may be an image format. In exemplary embodiment, the pre-call initiation image information may be an image including a section (e.g., geometric section) of the pre-call initiation screenshot image.

In an exemplary embodiment, image information may be embodied by an image, e.g., a screenshot. In another exemplary embodiment, image information may be embodied by information calculated from an image, for example, image information may be calculated by obtaining an image, e.g., a screenshot, then applying a one-way function, e.g., a hash function such as Message-Digest algorithm 5 (MD5), to (all or a portion) of the pixels of the obtained image thereby converting such pixels of the obtained image into a string.

In another exemplary embodiment, the pre-call initiation image information may have a data format that is different than the pre-call initiation screenshot image. In an exemplary embodiment, pre-call initiation image information may comprise data calculated by applying a mathematical function to information of the pre-call initiation screenshot image. In an exemplary embodiment, the pre-call initiation image information comprises data calculated by applying a function (e.g., one-way function, a hash function, a cryptographic function, a data compression function, or a data reduction function) to information of the pre-call initiation screenshot image. In an exemplary embodiment, the pre-call initiation image information comprises data calculated by applying a function (e.g., one-way function, a hash function, a cryptographic function, a data compression function, or a data reduction function) to a section (e.g., geometric section) of the pre-call initiation screenshot image.

The amount of memory needed to store the pre-call initiation image information may be significantly less than the amount of memory needed to store the pre-call initiation screenshot image. For example, memory spaced needed to store data resulting from applying a function, e.g., a hash function, to information of the pre-call initiation screenshot image may be significantly less than memory space needed to store the information of the pre-call initiation screenshot image. Therefore, it may be advantageous to obtain the pre-call initiation image information by applying the function, e.g., the hash function, to information of the pre-call initiation screenshot image.

At step S404, the Telephone Operability Verification module 302 initiates communication with the target telephone whose first image information was obtained in step S402. In an exemplary embodiment the Telephone Operability Verification module 302 facilitates or initiates communication with a target telephone by dialing (or calling) a target telephone.

Figure 5:
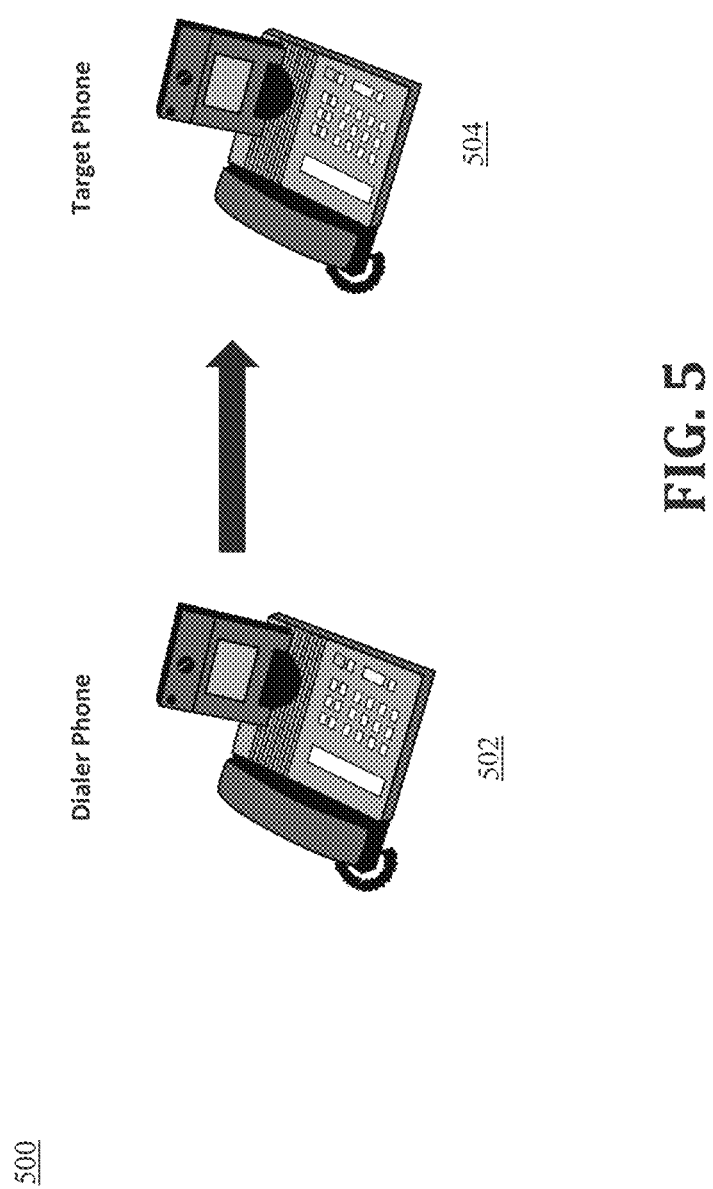
FIG. 5 shows an exemplary dialer telephone and an exemplary target telephone.

As illustrated in FIG. 5, portions of an exemplary automated phone call validation system 500 are shown. In an exemplary embodiment, there may be at least one dialer (or caller) telephone 502. The at least dialer telephone 502 may be used to initiate a telephone call with at least one target telephone 504. In an exemplary embodiment, the at least one dialer telephone 502 and the TOV device 202 are separate devices, and the TOV device 202 controls the dialer telephone 502. In another exemplary embodiment, the at least one dialer telephone 502 and the TOV device 202 are integrated into one device.

In an exemplary embodiment, a plurality of dialer telephones is used to dial a plurality of target telephones. In an exemplary embodiment, the TOV device 202 executes a computer program which causes the plurality of dialer telephones to call or dial the plurality of target telephones without human intervention. In an exemplary embodiment, a plurality of dialer telephones is located in a single facility, and a plurality of target telephones is located in at least one remote location.

In an exemplary embodiment, after initiating communication with a target device, if the target device is operational, the display of the target device will indicate that the target device has received the initiated communication. In an exemplary embodiment, either all or a portion of a display of an operational target device will change after receiving an initiated communication.

In an exemplary embodiment, after a dialer telephone 502 calls a target telephone 504, if the target telephone 504 is operational (e.g., if the target telephone 504 is receiving telephone calls), the target telephone 504 will ring, and the display of the target telephone 504 will indicate that the target telephone is ringing. Information of screenshots of the display of the target telephone 504 that are wholly or partially different before and after the dialer telephone 502 calls the target telephone 504 may be used by Telephone Operability Verification module 302 to determine that the target telephone 504 is operational.

Conversely, after initiating communication with a target device, if the target device is at least one of not receiving communications and not operational, the display of the target device will not indicate that the target device has received the initiated communication. In an exemplary embodiment, either all or a portion of a display of a nonoperational target device will not change after receiving an initiated communication.

In an exemplary embodiment, after a dialer telephone 502 calls a target telephone 504, if the target telephone 504 is at least one of not receiving communications and not operational (e.g., if the target telephone 504 is not receiving telephone calls), the target telephone 504 will not ring, and the display of the target telephone 504 will not indicate any ringing of the target telephone 504. Information of screenshots of the display of the target telephone 504 that are wholly or partially identical before and after the dialer telephone 502 calls the target telephone 504 may be used by Telephone Operability Verification module 302 to determine that the target telephone 504 is at least one of not receiving communications and not operational.

At step S406, the Telephone Operability Verification module 302 obtains or receives second image information of the target device after initiating communication with the target device at step S404. In an exemplary embodiment, the second image information may be post-call initiation image information. Post-call initiation image information may include, e.g., image information obtained, calculated, or received after initiating a telephone call with the target telephone (e.g., calling or dialing a target telephone).

In an exemplary embodiment, the post-call initiation image information is information relating to an image of a display of a target telephone at a time after the target telephone is called. For example, the post-call initiation image information may relate to a screenshot image of the display of the target telephone at a time after the target telephone is called. Hereinafter "post-call initiation screenshot image" refers a screenshot representing a display of a target telephone at a time after the target telephone is called.

In an exemplary embodiment, the post-call initiation screenshot image is captured within a predetermined amount of time after the Telephone Operability Verification module 302 initiates communication with the target telephone. For example, the post-call initiation screenshot image may be captured within 30 seconds of the Telephone Operability Verification module 302 initiating communication with the target telephone. In an exemplary embodiment, a post-call initiation screenshot image may be captured 1 second after communication is initiated, 4 seconds after communication is initiated, or any number of seconds after communication is initiated.

In another exemplary embodiment, a target telephone may automatically capture a screenshot when all or a predetermined portion of the display of the target telephone changes.

In an exemplary embodiment, a display of a target telephone may include a significant portion and an insignificant portion. The target telephone may not capture a screenshot if the only change to the display is a change to the insignificant portion of the display; however, the target telephone may capture a screenshot if there is a change to the significant portion of the display. In an exemplary embodiment, an insignificant portion of the display comprises at least one of a date, a time, and a clock portion. The significant portion of the display may comprise, e.g., a portion of the display other than the insignificant portion.

In an exemplary embodiment, similar to step S402, the Telephone Operability Verification module 302 may use an IP address of the target telephone to obtain a post-call initiation screenshot image. In an exemplary embodiment, the Telephone Operability Verification module 302 may take the post-call initiation screenshot image using a remote connection with the target telephone. In another exemplary embodiment, the Telephone Operability Verification module 302 may receive a post-call initiation screenshot image or may receive information derived from a post-call initiation screenshot image from the remote telephone over the Internet.

In an exemplary embodiment, the data format of the post-call initiation image information and the pre-call initiation screenshot image information is the same.

In an exemplary embodiment, if the data format of the pre-call initiation image information is an image data format, for example, the data format of the post-call initiation image information is also an image data format. In an exemplary embodiment, if the pre-call initiation image information is an image including a section (e.g., geometric section) of the pre-call initiation screenshot image, the post-call initiation image information is an image including a corresponding predetermined section (e.g., geometric section) of the pre-call initiation screenshot image.

In an exemplary embodiment, if the data format of the pre-call initiation image information is information including data calculated by applying a function (e.g., one-way function, a hash function, a cryptographic function, a data compression function, or a data reduction function) to information of the pre-call initiation screenshot image, the data format of the post-call initiation image information is information including data calculated by applying the function to information of the post-call initiation screenshot image. In an exemplary embodiment, if the pre-call initiation image information comprises data calculated by applying a function to a predetermined section (e.g., geometric section) of the pre-call initiation screenshot image, then the post-call initiation image information comprises data calculated by applying a function to a corresponding predetermined section (e.g., geometric section) of the post-call initiation screenshot image. The predetermined section of the pre-call initiation screenshot may be a significant section (e.g., a portion of the display that does not include at least one of a date, a time, and a clock) of the display of the target device, and the predetermined section of the post-call initiation screenshot may be a corresponding significant section of the display of the target device.

The amount of memory needed to store the post-call initiation image information may be significantly less than the amount of memory needed to store the post-call initiation screenshot image. For example, memory spaced needed to store data resulting from applying a function, e.g., a hash function, to information of the post-call initiation screenshot image may be significantly less than memory space needed to store the information of the post-call initiation screenshot image. Therefore, it may be advantageous to obtain the post-call initiation image information by applying the function, e.g., the hash function, to information of the post-call initiation screenshot image.

At step S408, the Telephone Operability Verification module 302 compares the first image information with the second image information. In an exemplary embodiment, the Telephone Operability Verification module 302 compares the pre-call initiation image information with the post-call initiation image information.

In an exemplary embodiment, the Telephone Operability Verification module 302 compares each respective pixel of (all or a portion of) the pre-call initiation screenshot image with a corresponding pixel of (all or a portion of) the post-call initiation screenshot image.

In another exemplary embodiment, the Telephone Operability Verification module 302 compares information calculated by applying a function to (all or a portion of) the pre-call initiation screenshot image with information calculated by applying the function to (all or a portion of) the post-call initiation screenshot image.

In an exemplary embodiment, the amount of processing time (and/or the amount of processing power) required to compare (a) data calculated by applying a function, e.g., a hash function, to (all or a portion of) the pre-call initiation screenshot image with (b) data calculated by applying the function to (all or a portion of) the post-call initiation screenshot image may be less than the amount of processing time (and/or the amount of processing power) required to compare (c) each respective pixel of (all or a portion of) the pre-call initiation screenshot image with (d) a corresponding pixel of (all or a portion of) the post-call initiation screenshot image. Therefore, it may be advantageous to compare data calculated by applying a function, e.g., a hash function, to (all or a portion of) the pre-call initiation screenshot image with data calculated by applying the function to (all or a portion of) the post-call initiation screenshot image.

At step S410, a determination is made based on the comparison performed at step S408. In particular, it is determined whether or not the first image information is identical to the second image information. In an exemplary embodiment, the Telephone Operability Verification module 302 determines whether or not the pre-call initiation image information is identical to the post-call initiation image information. If the pre-call initiation image information is identical to the post-call initiation image information, the process proceeds to step S414. If the pre-call initiation image information is not identical to the post-call initiation image information, the process proceeds to step S412.

At step S412, it is determined that the target device is operational. The process reaches step S412 when the Telephone Operability Verification module 302 determines that all or a portion of a display of a target telephone has changed after the Telephone Operability Verification module 302 called or dialed the target telephone. In an exemplary embodiment, such a change before and after calling the target telephone indicates that the target telephone is receiving calls and operating properly.

At step S414, the Telephone Operability Verification module 302 may perform an optical character recognition, e.g., on information of at least one of the pre-call initiation screenshot image and the post-call initiation screenshot image. If the Telephone Operability Verification module 302 recognizes "forwarded" on information of at least one of the pre-call initiation screenshot image and the post-call initiation screenshot image, the target telephone is determined to be in a "forwarded" state; if the Telephone Operability Verification module 302 recognizes "forwarded" on information of at least one of the pre-call initiation screenshot image and the post-call initiation screenshot image, the target telephone is determined to be in a "forwarded" state. If Telephone Operability Verification module 302 determines the target telephone is in at least one of a "forwarded" state and a "logged out" state, the process proceeds to step S416. If Telephone Operability Verification module 302 determines the target telephone is not in at least one of a "forwarded" state and a "logged out" state, the process proceeds to step S418.

At step S416, when the Telephone Operability Verification module 302 recognizes at least one of "forwarded" and "logged out" on, e.g., information of at least one of the pre-call initiation screenshot image and the post-call initiation screenshot image, the Telephone Operability Verification module 302 may determine that the target telephone is in at least one of a "forwarded" state and a "logged out" state. If the Telephone Operability Verification module 302 determines that the target telephone is in at least one of a "forwarded" state and a "logged out" state, the Telephone Operability Verification module 302 is unable to determine whether or not the target device is operational. In an exemplary embodiment, the Telephone Operability Verification module 302 determines that the target telephone in at least one of a "forwarded" state and a "logged out" state is not receiving calls.

In an exemplary embodiment, the Telephone Operability Verification module 302 may add the identity of the target device to a forwarded/logged out database. In an exemplary embodiment, the Telephone Operability Verification module 302 may attempt to re-verify the operability of any "forwarded" or "logged out" target devices by accessing the forwarded/logged out database at a later date or time.

At step S418, it may be determined that the target device is not operational. In an exemplary embodiment, if (1) the Telephone Operability Verification module 302 determines that all or a portion of a display of a target telephone does not change after the Telephone Operability Verification module 302 initiated communication with the target telephone and (2) the Telephone Operability Verification module 302, in performing optical character recognition, does not recognize at least one of "forwarded" and "logged out," the Telephone Operability Verification module 302 determines the target telephone is not operating properly.

In an exemplary embodiment, the Telephone Operability Verification module 302 may not perform optical character recognition. The Telephone Operability Verification module 302 may not perform optical character recognition, e.g., in order to quickly determine which target devices are operating properly. In an exemplary embodiment, at step S410, if the Telephone Operability Verification module 302 determines the pre-call initiation image information is identical to the post-call initiation image information, the Telephone Operability Verification module 302 may determine that the target telephone has an operability state of not receiving calls. In an exemplary embodiment, the Telephone Operability Verification module 302 determines at a later time whether a target telephone having a not-receiving-calls operability state was logged out or forwarded.

In exemplary embodiment, the Telephone Operability Verification module 302 may at least one of store and transmit an operation state, e.g., at least one of operational, not operational, not receiving calls, forwarded, and logged out. In another exemplary embodiment, the Telephone Operability Verification module 302 may at least one of store and transmit a list of target devices' operation states. The Telephone Operability Verification module 302 may transmit an operation state of at least one target device, e.g., to a member of the organization to which the target device pertains.

Figure 6:
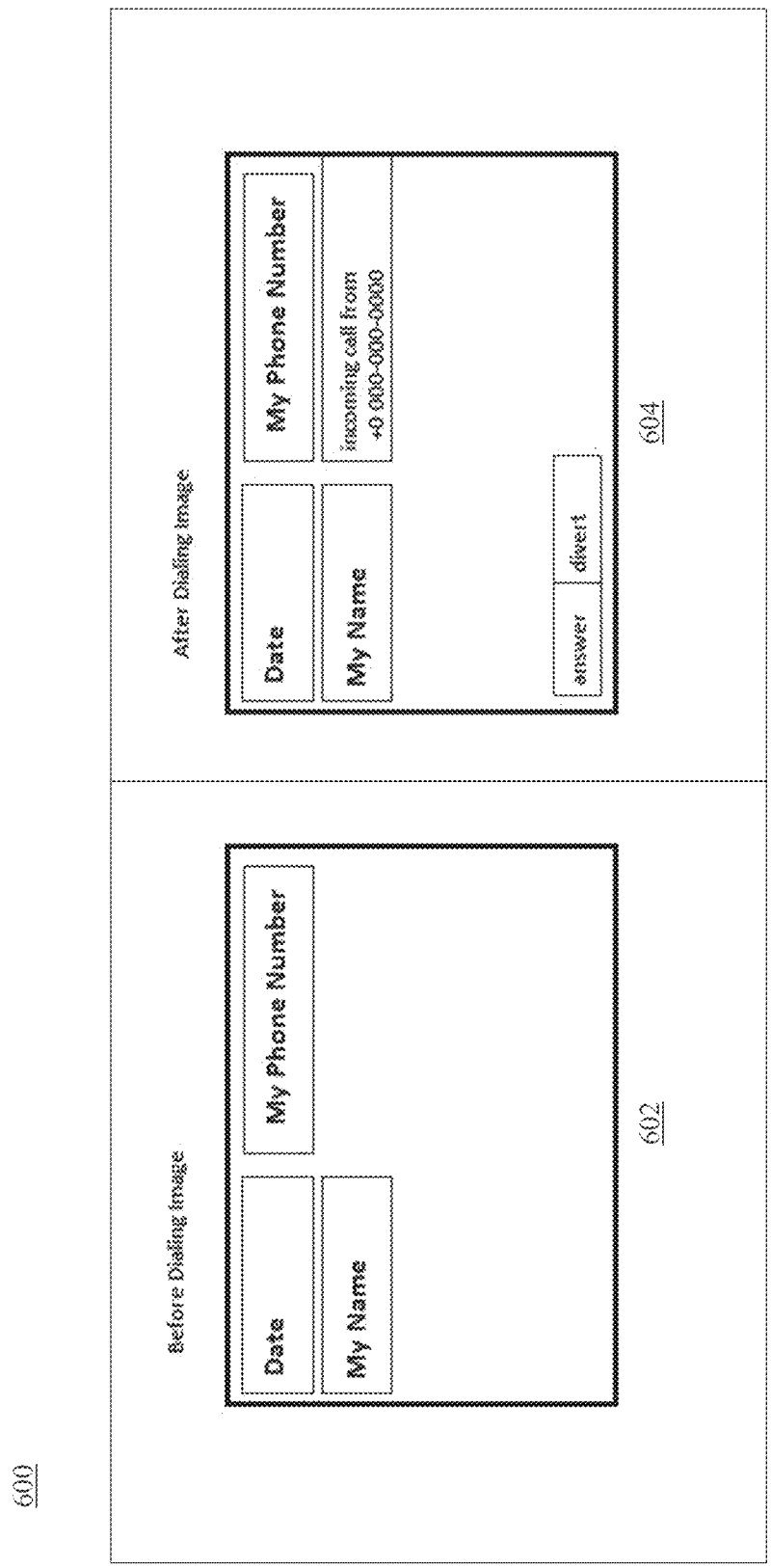
FIG. 6 shows exemplary images of a display of a target device relating to a determination that a target device is operational.

FIG. 6 shows an operational remote telephone image chart 600 in a case where a target telephone is determined to be operational.

As illustrated in FIG. 6, a Before Dialing Image 602 is an exemplary display of a target telephone captured prior to a Telephone Operability Verification module 302 initiating communication with the target telephone, e.g., prior to the Telephone Operability Verification module 302 dialing or calling the target telephone. Additionally, an After Dialing Image 604 is an exemplary display of a target telephone captured after the Telephone Operability Verification module 302 initiated communication with the target telephone, e.g., after the Telephone Operability Verification module 302 dials or calls the target telephone.

The Before Dialing Image 602 is an example of a pre-call initiation screenshot captured prior to a Telephone Operability Verification module 302 initiating communication with (e.g., dialing or calling) the target telephone, and the After Dialing Image 604 is an example of a post-call initiation screenshot captured after initiating communication with (e.g., dialing or calling) the target telephone.

As illustrated in FIG. 6, the After Dialing Image 604 is different than the Before Dialing Image 602. The Telephone Operability Verification module 302 is configured to obtain and compare the Before Dialing Image 602 and the After Dialing Image 604. If the Before Dialing Image 602 and the After Dialing Image 604 are not identical, as is shown in image chart 600, the target telephone is determined to be operational.

According to an exemplary embodiment, the Telephone Operability Verification module 302 is configured to perform an optical character recognition on the post-call initiation screenshot image, e.g., the After Dialing Image 604. In an exemplary embodiment, the optical character recognition performed by the Telephone Operability Verification module 302 is configured to recognize, e.g., "incoming call." If the optical character recognition performed by the Telephone Operability Verification module 302 recognizes, e.g., "incoming call," the Telephone Operability Verification module 302 may determine that the target telephone is operational. The text that is recognized by optical character recognition is not limited to any particular set of characters, and the text that is recognized by optical character recognition is any text that indicates that communication is operable.

Figure 7:
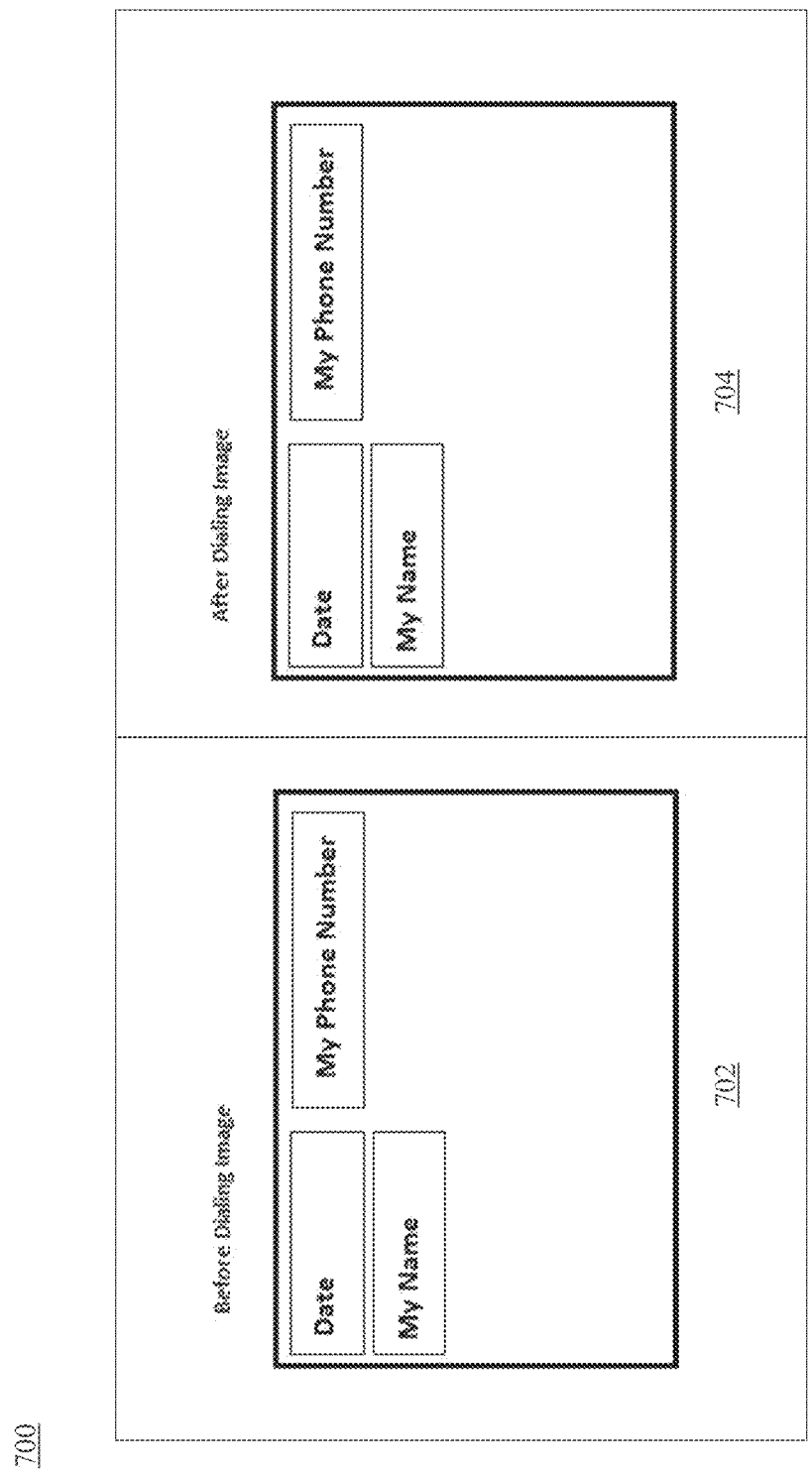
FIG. 7 shows exemplary images of a display of a target device relating to a determination that a target device is at least one of not receiving communications and not operational.

FIG. 7 shows a nonoperational remote telephone image chart 700 in a case where a target telephone is determined not to be operational.

As illustrated in FIG. 7, an After Dialing Image 704 is identical to a Before Dialing Image 702. The Telephone Operability Verification module 302 is configured to obtain and compare the Before Dialing Image 702 and the After Dialing Image 704. If the Before Dialing Image and the After Dialing Image are identical, as is shown in image chart 700, the target telephone is determined not to be operational.

As shown in the top left corner of the screen of the pre-call initiation screenshot 702, the display of the target telephone may include a date. The display of the target telephone may further include a time (not shown), which may be represented by a digital clock, an analog clock, or any other indication of time. The portion of the display of the target telephone that includes, e.g., a date, a time, and/or a clock, may be designated as an insignificant portion of display of the target telephone. A change or a lack of change to the insignificant portion of the display does not affect the determination of the operability of the target device. In an exemplary embodiment, if the insignificant portion (e.g., the time) of the Before Dialing Image 702 and the insignificant portion (e.g., the time) of the After Dialing Image 704 are different but the remaining portions of the Before Dialing Image 702 and the After Dialing Image 704 are identical, the Telephone Operability Verification module 302 may still determine that the remote telephone is at least one of not receiving communications and not operational.

Figure 8:
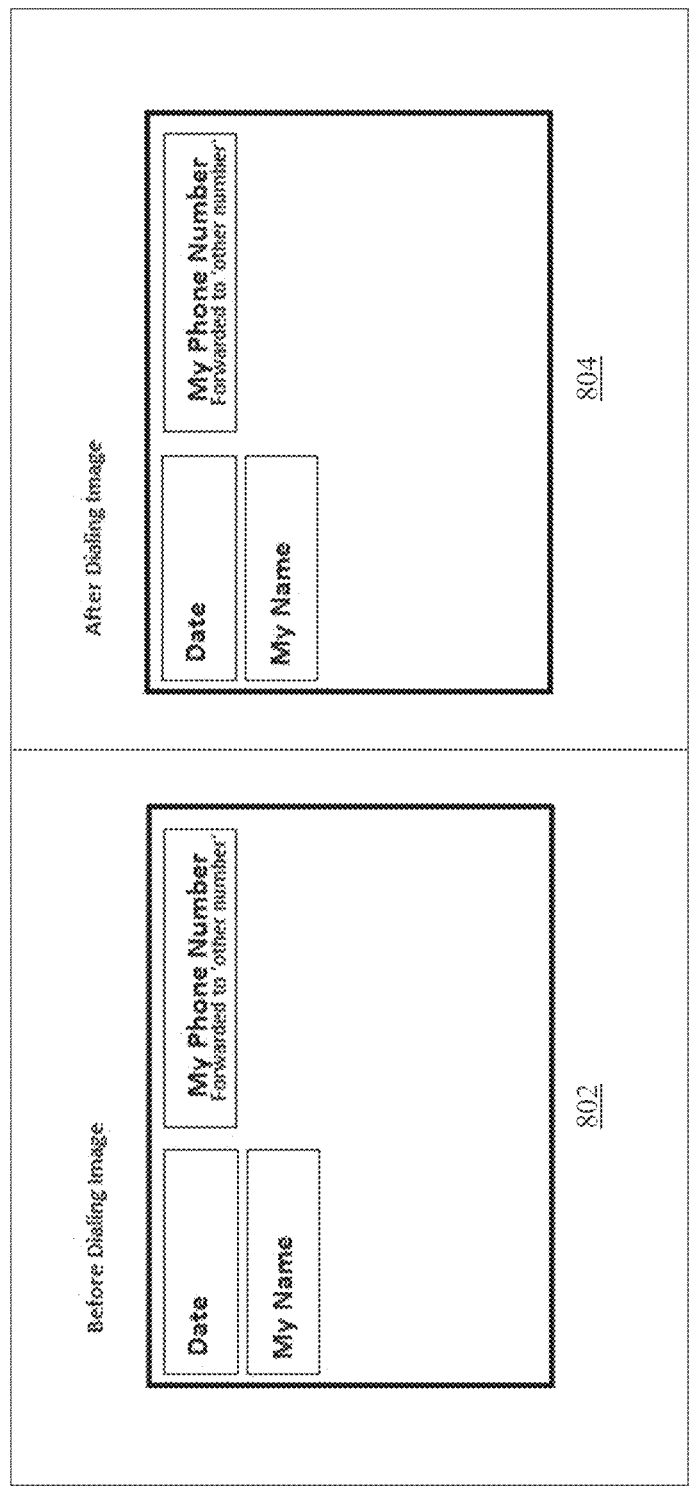
FIG. 8 shows exemplary images of a display of a target device relating to a determination that a target device is determined to be in a forwarded state.

FIG. 8 shows a forwarded remote telephone image chart 800 in a case where a target telephone is determined to be in a forwarded state.

As illustrated in FIG. 8, an After Dialing Image 804 identical to a Before Dialing Image 802 includes the character string "forwarded." The Telephone Operability Verification module 302 is not only configured to obtain and compare the Before Dialing Image 802 and the After Dialing Image 804, but the Telephone Operability Verification module 302 is also configured to perform optical character recognition on at least one of the Before Dialing Image 802 and the After Dialing Image 804. The optical character recognition may include the recognition of at least one of "forwarded" and "logged out." As shown in the forwarded remote telephone image chart 800, both of the Before Dialing Image 802 and the After Dialing Image 804 include "forwarded."

In an exemplary embodiment, the Telephone Operability Verification module 302 verifies an operability of each and every target device of a plurality of target devices. In an exemplary embodiment, the Telephone Operability Verification module 302 simultaneously verifies an operability of multiple target devices of the plurality of target devices. In yet another exemplary embodiment, the Telephone Operability Verification module 302 sequentially verifies the operability a plurality of target devices.

According to an exemplary embodiment, if the Before Dialing Image 802 and the After Dialing Image 804 are determined to be different, the remote telephone is determined to be operational, and the remote telephone would not to determine whether or not the remote telephone is in a forwarded or a logged out state. A portion of the Before Dialing Image 802 and the After Dialing Image 804 may include, e.g., a date, a time, and/or a clock, which may be designated as an insignificant portion of display of the target telephone. A change or a lack of change to the insignificant portion of the display may not affect the determination of the operability of the target device. In an exemplary embodiment, if the insignificant portion (e.g., the time) of the Before Dialing Image 802 and the insignificant portion (e.g., the time) of the After Dialing Image 804 are different but the remaining portions of the Before Dialing Image 802 and the After Dialing Image 804 are identical, the Telephone Operability Verification module 302 may still determine that the remote telephone is in a forwarded or a logged out state.

In an exemplary embodiment, the Telephone Operability Verification module 302 first makes a determination on operability of the remote telephone by comparing the significant portions of the Before Dialing Image 802 and the After Dialing Image 804. In this exemplary embodiment, if the Telephone Operability Verification module 302 determines the remote telephone is at least one of not receiving communications and not operational (i.e., the Telephone Operability Verification module 302 determines the Before Dialing Image 802 and the After Dialing Image 804 are identical), the Telephone Operability Verification module 302 then performs optical character recognition on at least one of the Before Dialing Image 802 and the After Dialing Image 804.

According to another exemplary embodiment, the Telephone Operability Verification module 302 then performs optical character recognition on the Before Dialing Image 802 prior to making a determination regarding operability, i.e., prior to determining whether all or a portion of the Before Dialing Image 802 and the After Dialing Image 804 are identical.

Through the optical character recognition, if the Telephone Operability Verification module 302 recognizes "forwarded" in the at least one of the Before Dialing Image 802 and the After Dialing Image 804, the Telephone Operability Verification module 302 determines the remote telephone is in a forwarded state. If the Telephone Operability Verification module 302 recognizes "logged out" in the at least one of the Before Dialing Image 802 and the After Dialing Image 804, the Telephone Operability Verification module 302 determines the remote telephone is in a logged out state. The text that the Telephone Operability Verification module 302 recognizes as indicating a forwarded state is not limited to the text "forwarded" and the text that the Telephone Operability Verification module 302 recognizes as indicating a logged out state is not limited to the text "logged out," and text that the Telephone Operability Verification module 302 recognizes as indicating a forwarded state or a logged out state may be any text that indicates a forwarded state or a logged out state.

Accordingly, with this technology, an optimized process for verifying an operability of a target device is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for verifying an operability of a target device, the method comprising:
   obtaining, by a processor, first image information of the target device;
   initiating, by the processor, a communication with the target device after the first image information is obtained;
   obtaining, by the processor, second image information of the target device after the communication with the target device is initiated;
   comparing, by the processor, the first image information with the second image information; and
   determining, by the processor, whether the target device is operational based on a result of the comparing,
   wherein the target device is determined as being operational when the first image information is different from the second image information.

2. The method of claim 1, wherein the target device is determined as at least one of not receiving communications and not operational when the first image information is identical to the second image information.

3. The method of claim 1, wherein:
   the first image information comprises information calculated by applying a one-way hash function to a portion of a first image of a display of the target device, and
   the second image information comprises information calculated by applying the one-way hash function to a portion of a second image of the display of the target device.

4. The method of claim 1, wherein the comparing includes comparing each respective pixel of the first image information with a corresponding pixel of the second image information.

5. The method of claim 1, wherein:
   the first image information is information that relates to a first screenshot of a display of the target device, and
   the second image information is information that relates to a second screenshot of the display of the target device.

6. The method of claim 1, further comprising:
   performing, by the processor, optical character recognition on at least one of the first image information and the second image information.

7. The method of claim 6, wherein the performing the optical character recognition includes a recognition of at least one of "forwarded" and "logged out.".

8. The method of claim 1, wherein the target device is a telephone.

9. The method of claim 8, wherein the initiating includes dialing the telephone.

10. A computing apparatus for verifying an operability of a target device, the computing apparatus comprising:
    a processor;
    a memory; and
    a communication interface coupled to each of the processor, the memory, and a display screen,
    wherein the processor is configured to:
      obtain first image information of the target device;
      initiate a communication with the target device after the first image information is obtained;
      obtain second image information of the target device after the communication with the target device is initiated;
      compare the first image information with the second image information; and
      determine whether the target device is operational based on a result of the comparison,
    wherein the processor is further configured to determine the target device is operational when the first image information is different from the second image information.

11. The computing apparatus of claim 10, wherein the processor is further configured to determine the target device is at least one of not receiving communications and not operational when the first image information is identical to the second image information.

12. The computing apparatus of claim 10, wherein:
    the first image information comprises information calculated by applying a one-way hash function to a portion of a first image of a display of the target device, and
    the second image information comprises information calculated by applying the one-way hash function to a portion of a second image of the display of the target device.

13. The computing apparatus of claim 10, wherein the processor is further configured to compare each respective pixel of the first image information with a corresponding pixel of the second image information.

14. The computing apparatus of claim 10, wherein:
    the first image information is information that relates to a first screenshot of a display of the target device, and
    the second image information is information that relates to a second screenshot of the display of the target device.

15. The computing apparatus of claim 10, wherein the processor is further configured to perform an optical character recognition on at least one of the first image information and the second image information.

16. The computing apparatus of claim 15, wherein the processor is further configured to perform the optical character recognition by recognizing at least one of "forwarded" and "logged out.".

17. The computing apparatus of claim 10, wherein the target device is a telephone.

18. The computing apparatus of claim 17, wherein the processor is further configured to initiate the communication with the target device by dialing the telephone.

\* \* \* \* \*